US012647919B2

(12) United States Patent
Tsai et al.

(10) Patent No.: US 12,647,919 B2
(45) Date of Patent: Jun. 2, 2026

(54) COMMUNICATION DEVICE AND METHOD FOR DYNAMICALLY ADJUSTING TIME INTERVAL OF DETECTION OPERATION FOR DETECTING NEIGHBOR NETWORK DEVICE

(71) Applicant: Realtek Semiconductor Corp., HsinChu (TW)

(72) Inventors: Chia-Lung Tsai, HsinChu (TW); Jui-Peng Tsai, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 338 days.

(21) Appl. No.: 18/608,867

(22) Filed: Mar. 18, 2024

(65) Prior Publication Data

US 2024/0323884 A1      Sep. 26, 2024

(30) Foreign Application Priority Data

Mar. 23, 2023      (TW) .................................. 112110844

(51) Int. Cl.
*H04W 56/00*              (2009.01)
(52) U.S. Cl.
CPC ....... *H04W 56/005* (2013.01); *H04W 56/001* (2013.01)
(58) Field of Classification Search
CPC ........................... H04W 56/005; H04W 56/001
See application file for complete search history.

(56) References Cited

U.S. PATENT DOCUMENTS

| | | |
|---|---|---|
| 2013/0225169 A1 | 8/2013 | Farnsworth |
| 2017/0187511 A1* | 6/2017 | Bai ................... H04W 56/0015 |
| 2023/0124729 A1* | 4/2023 | Lin ................... H04W 36/0058 |
| | | 370/252 |

FOREIGN PATENT DOCUMENTS

| | | |
|---|---|---|
| CN | 107852631 A | 3/2018 |
| CN | 110114998 A | 8/2019 |
| WO | 2013/133210 A1 | 9/2013 |

OTHER PUBLICATIONS

ETSI TS 136 304 V14.7.0, Oct. 2018.
ETSI TS 136 331 V14.16.0, Jan. 2021.

* cited by examiner

*Primary Examiner* — Chuong A Ngo
(74) *Attorney, Agent, or Firm* — Winston Hsu

(57) ABSTRACT
A communication device includes a wireless transceiver circuit and a processor. The wireless transceiver circuit transmits and receives wireless signals. The processor processes the wireless signals to obtain information regarding a first period configured by a serving network device in order to measure signal strength of the serving network device and obtain information regarding a second period configured by the serving network device in order to detect a neighbor network device. The processor further determines whether an event related to low communication delay is triggered. When determining that the event related to low communication delay is not triggered, the processor performs a detection operation to detect the neighbor network device according to the second period. When determining that the event related to the low communication delay is triggered, the processor performs the detection operation to detect the neighbor network device according to a third period shorter than the second period.

12 Claims, 5 Drawing Sheets

COMMUNICATION DEVICE AND METHOD FOR DYNAMICALLY ADJUSTING TIME INTERVAL OF DETECTION OPERATION FOR DETECTING NEIGHBOR NETWORK DEVICE

BACKGROUND OF THE INVENTION

1. Field of the Invention

The present invention is related to a method for reducing a communication delay of a mobile device in Narrow Band Internet of things (NBIoT) applications, and more particularly, to a method for reducing the communication delay of the mobile device generated due to a synchronization operation by dynamically adjusting a time interval of a detection operation of a neighbor network device.

2. Description of the Prior Art

Due to mobile devices' portability, such devices which include a communication function (e.g., mobile phones or tablets) have become indispensable equipment for users. The basic requirement of the mobile devices is to provide smooth and nearly delay-free communication services.

For a moving mobile device, a time delay for the mobile device to provide communication services may increase due to significant changes in the communication environment. For example, after an idle mobile device has been moved over a long distance and a user activates a communication function of the mobile device through a user interface, the user has to wait for several seconds before the mobile device informs the user that a communication connection has been successfully established, resulting in a communication delay. For systems that may not need to consider power consumption, this will be additional waiting time.

SUMMARY OF THE INVENTION

It is therefore one of the objectives of the present invention to provide a method for effectively reducing a communication delay of a mobile device, to address the above-mentioned issues.

According to an embodiment of the present invention, a communication device is provided. The communication device comprises a wireless transceiver circuit and a processor. The wireless transceiver circuit is arranged to transmit or receive a plurality of wireless signals. The processor is arranged to process the plurality of wireless signals to obtain information regarding a first period configured by a serving network device in order to measure signal strength of the serving network device in an idle mode and obtain information regarding a second period configured by the serving network device in order to detect a neighbor network device in the idle mode, and perform a measurement operation upon the serving network device according to the first period. The processor is further arranged to determine whether an event related to a low communication delay is triggered. In response to the event not being triggered, the processor performs a detection operation to detect the neighbor network device according to the second period. In response to the event being triggered, the processor performs the detection operation to detect the neighbor network device according to a third period, wherein the third period is shorter than the second period.

According to an embodiment of the present invention, a method for dynamically adjusting a time interval of a detection operation for detecting a neighbor network device performed by a communication device is provided. The method comprises: obtaining information regarding a first period configured by a serving network device in order to measure signal strength of the serving network device in an idle mode and obtaining information regarding a second period configured by the serving network device in order to detect the neighbor network device in the idle mode; performing a measurement operation according to the first period; and performing the detection operation. Before the detection operation is performed, the method further comprises: determining whether an event related to a low communication delay is triggered. In response to the event not being triggered, the detection operation is performed according to the second period. In response to the event being triggered, the detection operation is performed according to a third period, wherein the third period is shorter than the second period.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
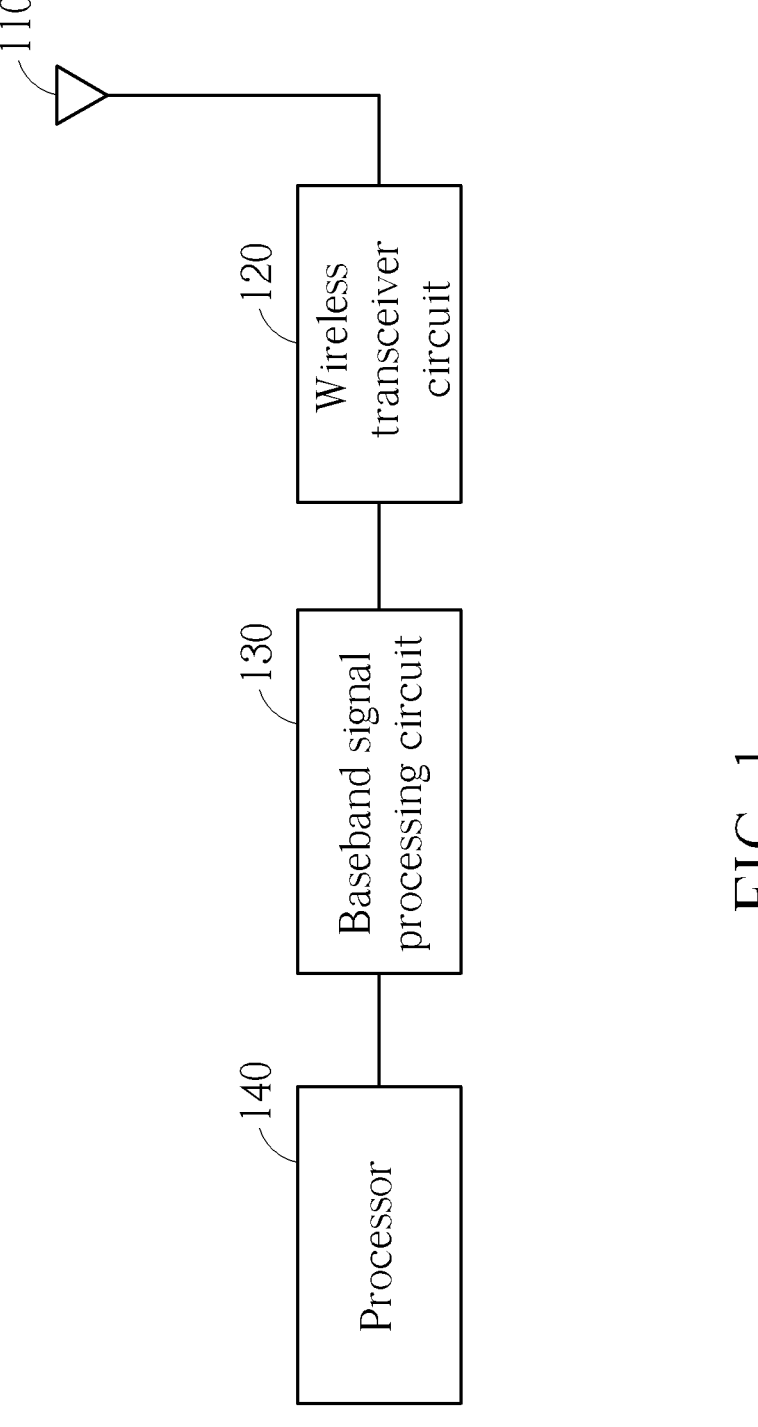
FIG. 1 is a block diagram of a communication device according to an embodiment of the present invention.

FIG. 1 is a block diagram of a communication device 100 according to an embodiment of the present invention, wherein the communication device 100 includes at least one antenna 110, a wireless transceiver circuit 120, a baseband signal processing circuit 130, and a processor 140.

The wireless transceiver circuit 120 is arranged to receive and process a wireless (radio frequency (RF)) signal from a wireless transmission channel through the at least one antenna 110 to obtain a transmitted packet, and process a packet to be transmitted to obtain a corresponding signal as the wireless signal for transmitting the wireless signal through the at least one antenna 110. For example, the wireless transceiver circuit 120 may perform power amplification/attenuation and upconversion/downconversion to convert a baseband signal into a wireless signal or convert a received wireless signal into a baseband signal.

The baseband signal processing circuit 130 is arranged to process the baseband signal. Specifically, the baseband signal processing circuit 130 may convert data to be transmitted into a transmitted packet according to a corresponding communication protocol, or convert a received packet into data with a data format that can be processed by a back-end circuit according to a corresponding communication protocol.

The processor 140 is arranged to control operations of the communication device 100, and internally includes a plurality of sub-circuits/functional modules implemented by a combination or any of hardware, firmware, and software, for performing required signal processing functions. For example, the processor may internally include sub-circuits/functional modules a that schedule transmission operation or a reception operation of the communication device 100 according to network configuration, channel evaluation sub-circuits/functional modules, signal quality evaluation sub-circuits/functional modules, and packet parsing sub-circuits/functional modules.

It should be noted that only the components pertinent to the present invention are illustrated in FIG. 1. In practice, the communication device 100 may include additional components to achieve designated functions. In some embodiments, the processor 140 and the baseband signal processing circuit 130 are two independent components. In some embodiments, the processor 140 and the baseband signal processing circuit 130 are integrated into a single component, such as a system on a chip (SoC). As a result, the present invention is not limited to the architecture shown in FIG. 1.

The communication device 100 may be a user equipment (UE) or a mobile device in Narrow Band Internet of things (NBIoT) applications. The communication device 100 may be registered in a serving network device and camp on a cell managed by the serving network device through a radio link established between the communication device 100 and the serving network device, wherein the network device, such as the serving network device and a neighbor network device, may be a base station (BS) or a node-B (NB) in the wireless network or other network device that can provide wireless network access service to the communication device 100.

When the communication device 100 has been registered but has not established a dedicated connection with the serving network device, or there is no data to be transmitted between the communication device 100 and the serving network device, the communication device 100 may operate in an idle mode. In the idle mode, most of the hardware of the communication device 100, such as the at least one antenna 110, the wireless transceiver circuit 120 and/or partial circuits within the baseband signal processing circuit 130, may operate in a sleep mode or may be powered off for saving power consumption of the communication device 100. In addition, in the idle mode, the hardware operating in the sleep mode or being powered off may be woken up or powered on periodically or intermittently to perform a detection operation and/or a measurement operation for the network device. This operation mode can be referred to as discontinuous reception (DRX), which allows the communication device 100 to have an opportunity to monitor whether there is a paging message belonging to the communication device 100, obtain synchronization information for synchronizing with the network device, and determine whether the communication device 100 should continue to camp on the same cell or should reselect a more suitable cell through a regular measurement operation.

The processor 140 may process a plurality of wireless signals received from the serving network device to obtain information regarding a first period configured by the serving network device in order to measure signal strength of the serving network device in the idle mode and obtain information regarding a second period configured by the serving network device in order to detect a neighbor network device, wherein the first period may be a DRX cycle or a paging cycle defined in a communication protocol related to 3GPP, and the second period may be a detection period Tdetect defined in the above-mentioned communication protocol. In addition, the processor 140 may obtain information regarding a measurement period configured by the serving network device to measure the neighbor network device in the idle mode, wherein the measurement period may be a measurement period Tmeasure defined in the above-mentioned communication protocol. The serving network device may make parameters or information related to the DRX cycle, the paging cycle, the measurement period Tmeasure, and the detection period Tdetect carried in the system information (SI) directly or indirectly, so that the processor 140 may obtain the related parameters by receiving the SI. In other words, the information regarding the first period and the information regarding the second period may be carried in the SI transmitted by the serving network device.

The detection period and the measurement period configured by the network device may be further subdivided into a detection period and a measurement period of an intra-frequency (e.g. a frequency the same as that of a camped-on cell) and a detection period and a measurement period of an inter-frequency. As a result, the above-mentioned detection period Tdetect and the measurement period Tmeasure are actually general terms without any deliberate distinction. Those skilled in the art can understand that, for different network devices, the communication device 100 may obtain one or more related parameters configured by the network side, and determine a corresponding detection period and a corresponding measurement period according to the one or more related parameters. For brevity, the following paragraphs will continue to use the detection period Tdetect and the measurement period Tmeasure to represent a detection period and a measurement period that correspond to any network device.

Figure 2:
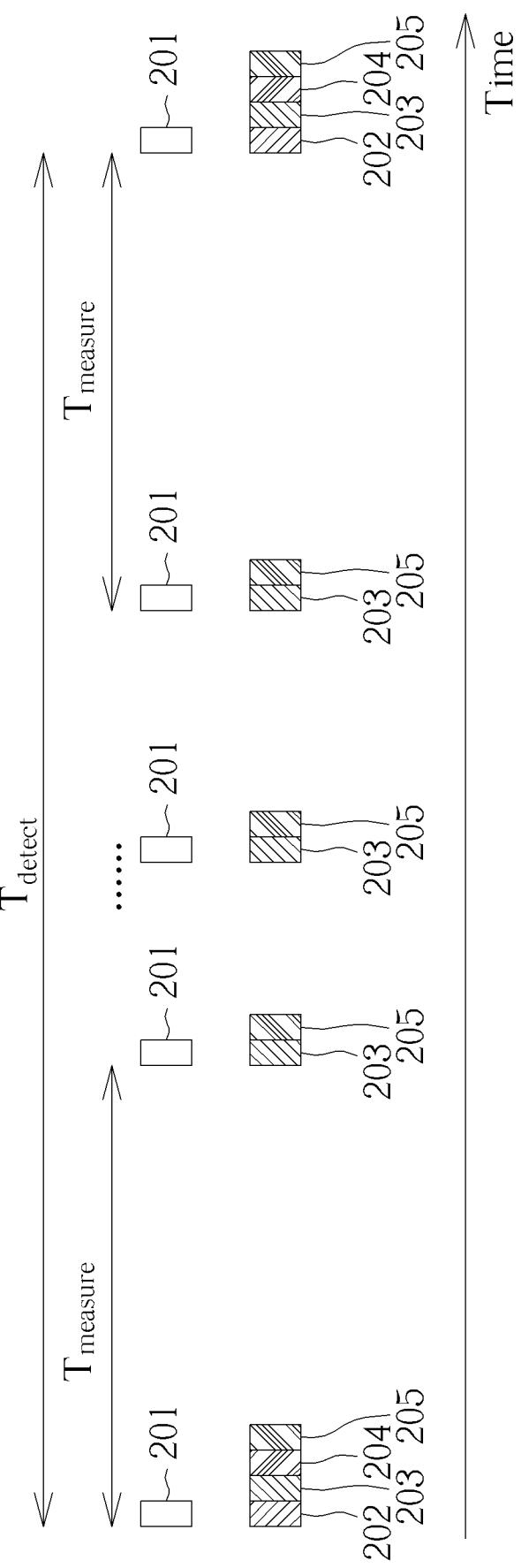
FIG. 2 is a diagram illustrating a detection operation and a measurement operation for one or more network devices according to an embodiment of the present invention, wherein the detection operation and the measurement operation are performed according to a detection period and a measurement period configured by a serving network device in an idle mode.

FIG. 2 is a diagram illustrating a detection operation and a measurement operation for one or more network devices according to an embodiment of the present invention, wherein the detection operation and the measurement operation are performed according to a detection period and a measurement period configured by a serving network device in an idle mode. In this embodiment, a length of the measurement period Tmeasure is equal to that of a DRX cycle, a length of the detection period Tdetect is much larger than that of the measurement period Tmeasure (e.g., the length of the detection period Tdetect may be dozens of times the length of the measurement period Tmeasure, and can be derived based on multiples of the DRX cycle). The communication device 100 may wake up related hardware at each paging occasion (PO) 201 to monitor whether there is a paging message belonging to the communication device 100, and perform a cell search (CS) 202 and a cell measurement (CM) 203 for the intra-frequency and a CS 204 and a CM 205 for the inter-frequency according to the detection period Tdetect and the measurement period Tmeasure, wherein the CS includes the above-mentioned detection operation, and the CM includes the above-mentioned measurement operation.

If the detection operation and the measurement operation are performed according to the detection period and the measurement period configured by the serving network device, the communication device 100 may wake up at each detection period Tdetect to perform the CS (e.g., the CS 202 of the intra-frequency and/or the CS 204 of the inter-frequency), and wake up at each measurement period Tmeasure to perform the CM (e.g., the CM 203 of the intra-frequency and/or the CM 205 of the inter-frequency).

For the CS, the detection operation for detecting a neighbor network device may include: (A) receiving a plurality of first synchronization signals transmitted by the neighbor network device and achieving frequency synchronization with the neighbor network device according to the first synchronization signals; and (B) receiving a plurality of second synchronization signals transmitted by the neighbor network device and achieving time synchronization with the neighbor network device according to the second synchronization signals. The first synchronization signals and the second synchronization signals may be reference signals for frequency synchronization and time synchronization provided to UEs in the NBIoT applications. For example, the first synchronization signals may be narrowband primary synchronization signals (NPSSs), and the second synchronization signals may be narrowband secondary synchronization signals (NSSSs). By performing the detection operation, the communication device 100 may obtain synchronization information of the neighbor network device, and achieve the time synchronization and the frequency synchronization with the neighbor network device.

For the CM, the measurement operation corresponding to a serving/neighbor network device may include: measuring a narrowband reference signal (NRS) transmitted by the serving/neighbor network device (e.g., a receiving power of the serving/neighbor network device) to obtain a measurement result corresponding to the signal strength of the serving/neighbor network device.

When the signal strength of the serving network device is sufficient, since the probability of triggering cell reselection is extremely low, the UE does not further measure the signal strength of the neighbor network device to achieve better power saving effects. The serving network device usually configures corresponding measurement rules through the SI, allowing the UE to determine whether it is necessary to further perform corresponding CS and CM upon the neighbor network device, wherein the CS includes the above-mentioned detection operation, and the CM includes the above-mentioned measurement operation.

When the UE operating at the idle mode starts to move or enters an environment with drastic signal changes, the measurement rule configured by the serving network device may limit the detection operation and the measurement operation of the UE, so that the UE cannot obtain the latest synchronization information of the neighbor network device in real time, and the communication delay of the UE is increased.

In order to solve this issue, the communication device 100 can dynamically adjust a time interval of a detection operation for detecting the neighbor network device (e.g., adjust the detection period), so that the communication device 100 can obtain or update the synchronization information of the neighbor network device in a timely manner, thereby effectively shortening the communication delay.

Figure 3:
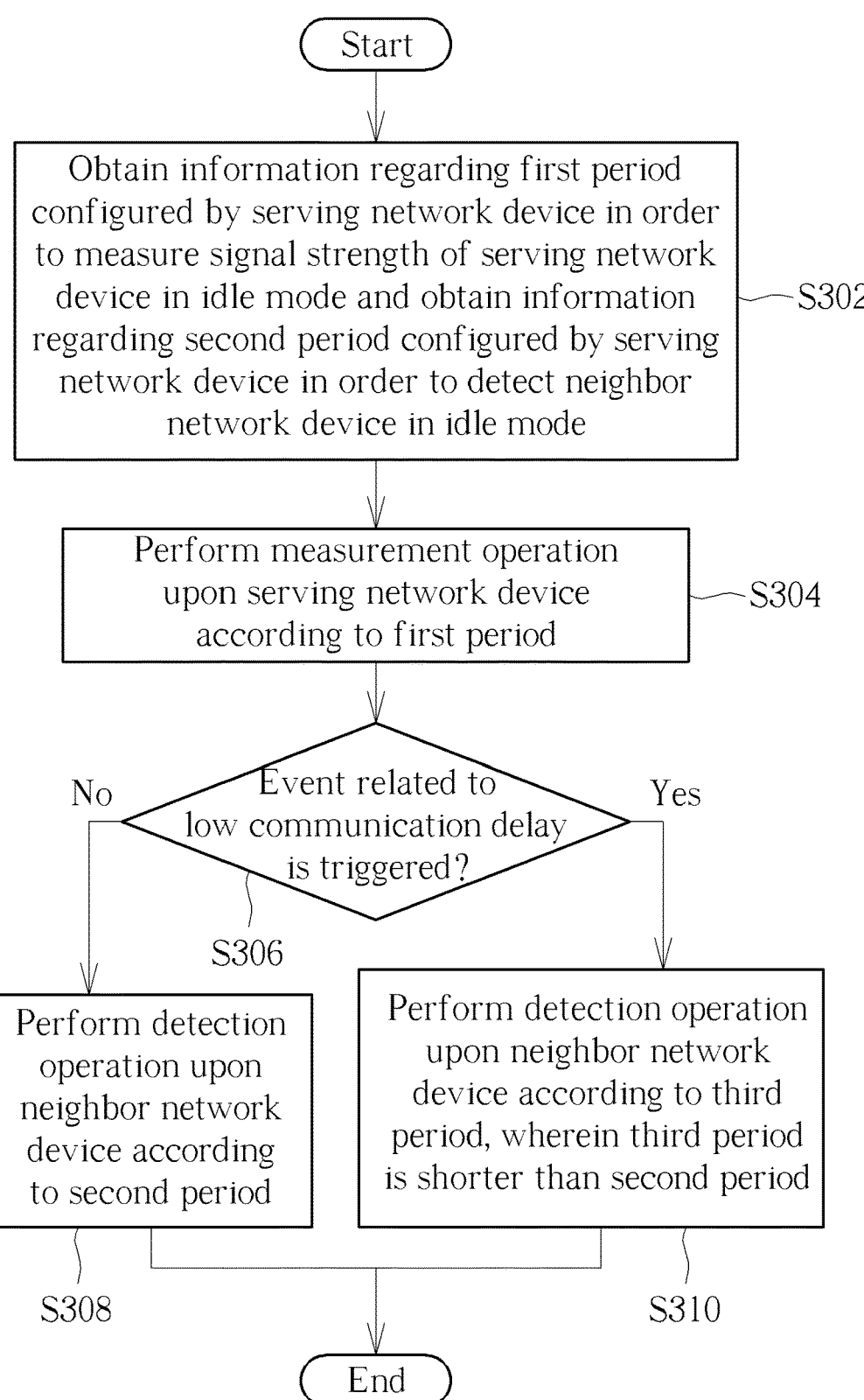
FIG. 3 is a flow chart of a method for dynamically adjusting a time interval of a detection operation for detecting a neighbor network device according to an embodiment of the present invention.

FIG. 3 is a flow chart of a method for dynamically adjusting a time interval of a detection operation for detecting a neighbor network device according to an embodiment of the present invention.

In Step S302, the information regarding the first period configured by the serving network device in order to measure the signal strength of the serving network device in the idle mode and the information regarding the second period configured by the serving network device in order to detect the neighbor network device are obtained, wherein the first period may be the above-mentioned DRX cycle or the paging cycle, and the second period may be the detection period Tdetect.

In Step S304, a measurement operation is performed upon the serving network device according to the first period.

In Step S306, it is determined whether an event related to a low communication delay is triggered. If Yes, Step S310 is entered; if No, Step S308 is entered.

In Step S308, a detection operation is performed upon the serving network device according to the second period.

In Step S310, a detection operation is performed upon the serving network device according to a third period, wherein the third period is shorter than the second period.

Steps S304-S310 may be operations performed by the communication device 100 in the idle mode.

The processor 140 may determine that the event related to the low communication delay is triggered in response to reception of a power supply notification signal, wherein the power supply notification signal may be generated by a detection device or an application, and may indicate an external power is provided to the communication device 100. For example, the detection device may continue to detect whether an external power is provided to the communication device 100 through a charging cable, a power cord, or a charging station. The above external power is different from a power supply of a battery device configured by the communication device 100, and can continuously (and stably) provide power to the communication device 100, so that the communication device 100 can provide users with low communication delay communication services without worrying about power consumption.

In this embodiment, the processor 140 may continue to determine whether the power supply notification signal is received, and determine that the event related to the low communication delay is triggered in response to the reception of the power supply notification signal.

In another embodiment, the processor 140 may determine whether the event related to the low communication delay is triggered according to a measurement result of the signal strength of the serving network device. When the measurement result indicates that the signal strength of the serving network device is lower than a threshold value, the processor 140 determines that the event related to the low communication delay is triggered. When the signal quality of the serving network device is poor (e.g., the signal strength is lower than the threshold value), the communication device 100 may be far away from the serving network device, thereby increasing the probability of triggering the cell reselection. If the currently configured DRX cycle is too long, the communication device 100 may not be able to detect signal changes between the serving network device and the neighbor network device in a timely manner, thus delaying triggering of the cell reselection. In addition, in the absence of the latest synchronization information of the neighbor network device, additional time must be spent to achieve time synchronization and frequency synchronization with the neighbor network device.

As a result, the processor 140 may determine that the event related to the low communication delay is triggered when the measurement result indicates the signal strength of the serving network device is lower than the threshold value.

In addition, when the measurement result indicates that the signal strength of the serving network device is lower than the threshold value, the processor 140 may further determine whether the power supply notification signal is received or determine whether an external power continuously (and stably) provides power to the communication device 100. If Yes, the processor 140 determines that the event related to the low communication delay is triggered.

After determining that the event related to the low communication delay is triggered, the processor 140 may shorten the detection period for performing the detection operation (e.g., shorten the second period configured by the network device as the third period).

In addition, the processor 140 may dynamically determine or adjust a length of the third period (or shortened amplitude of the second period) according to the measurement result of the signal strength of the serving network device. For example, worse signal strength may correspond to greater shortened amplitude. The processor 140 may also dynamically determine or adjust the length of the third period (or the shortened amplitude of the second period) according to current power supply status or remaining battery power of the communication device 100. For example, higher remaining battery power may correspond to greater shortened amplitude.

Figure 4:
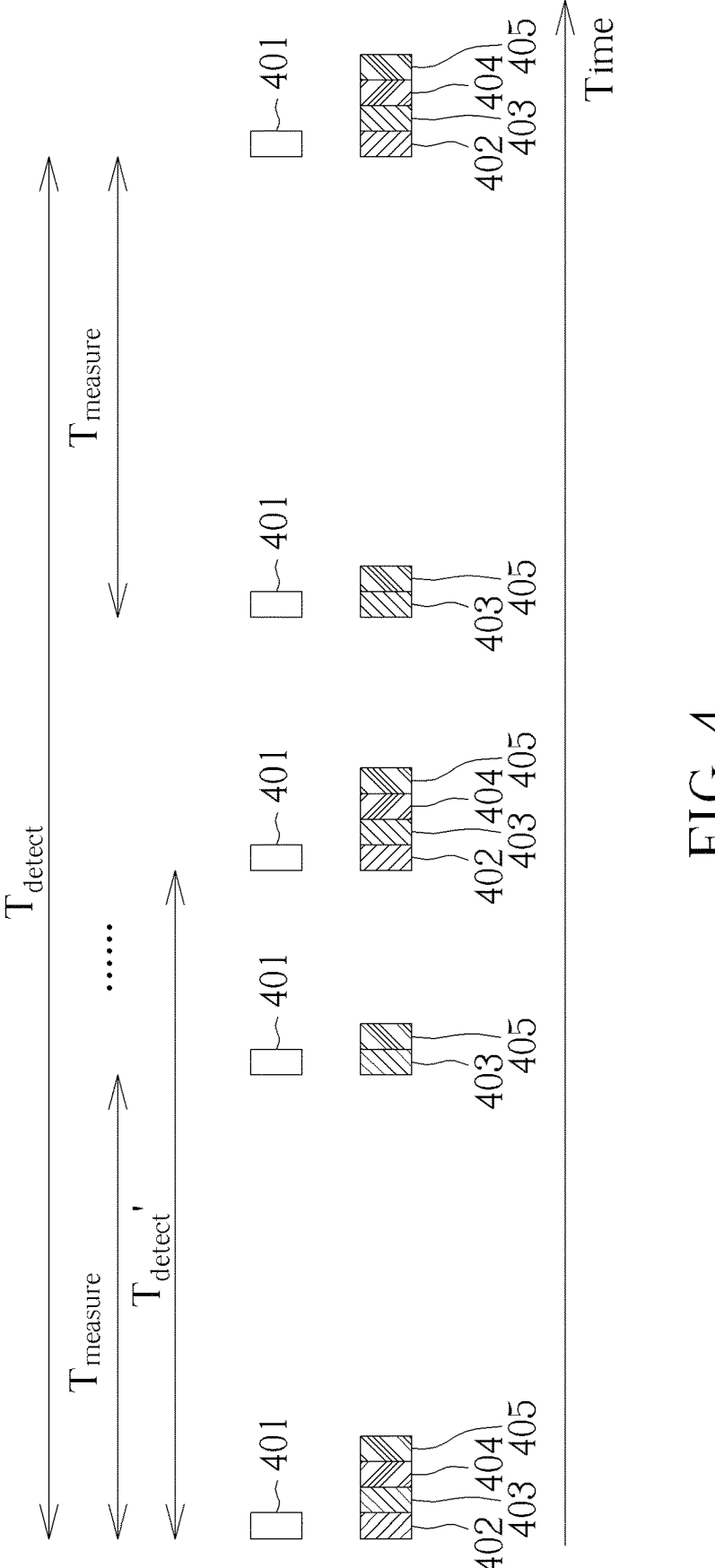
FIG. 4 is a diagram illustrating a detection operation and a measurement operation for one or more network devices according to an embodiment of the present invention, wherein the detection operation and the measurement operation are performed according to a shortened detection period in an idle mode.

FIG. 4 is a diagram illustrating a detection operation and a measurement operation for one or more network devices according to an embodiment of the present invention, wherein the detection operation and the measurement operation are performed according to a shortened detection period in an idle mode. A length of the measurement period Tmeasure is equal to that of a DRX cycle or that of a paging cycle. A length of the detection period Tdetect is much larger than that of the measurement period Tmeasure.

The communication device 100 may wake up related hardware at each PO 401 to monitor whether there is a paging message belonging to the communication device 100, and perform a CM 403 for the intra-frequency and a CM 405 for the inter-frequency according to the measurement period Tmeasure, wherein the CM includes the above-mentioned measurement operation.

The difference between the embodiment shown in FIG. 4 and the embodiment shown in FIG. 2 is that the communication device 100 performs a CS 402 for the intra-frequency and a CS 404 for the inter-frequency according to a shortened detection period Tdetect' in FIG. 4, wherein a length of the detection period Tdetect' is shorter than that of the detection period Tdetect configured by the network, and the CS includes the above-mentioned detection operation. In this way, the communication device 100 can obtain or update the synchronization information of the neighbor network device in a timely manner.

Figure 5:
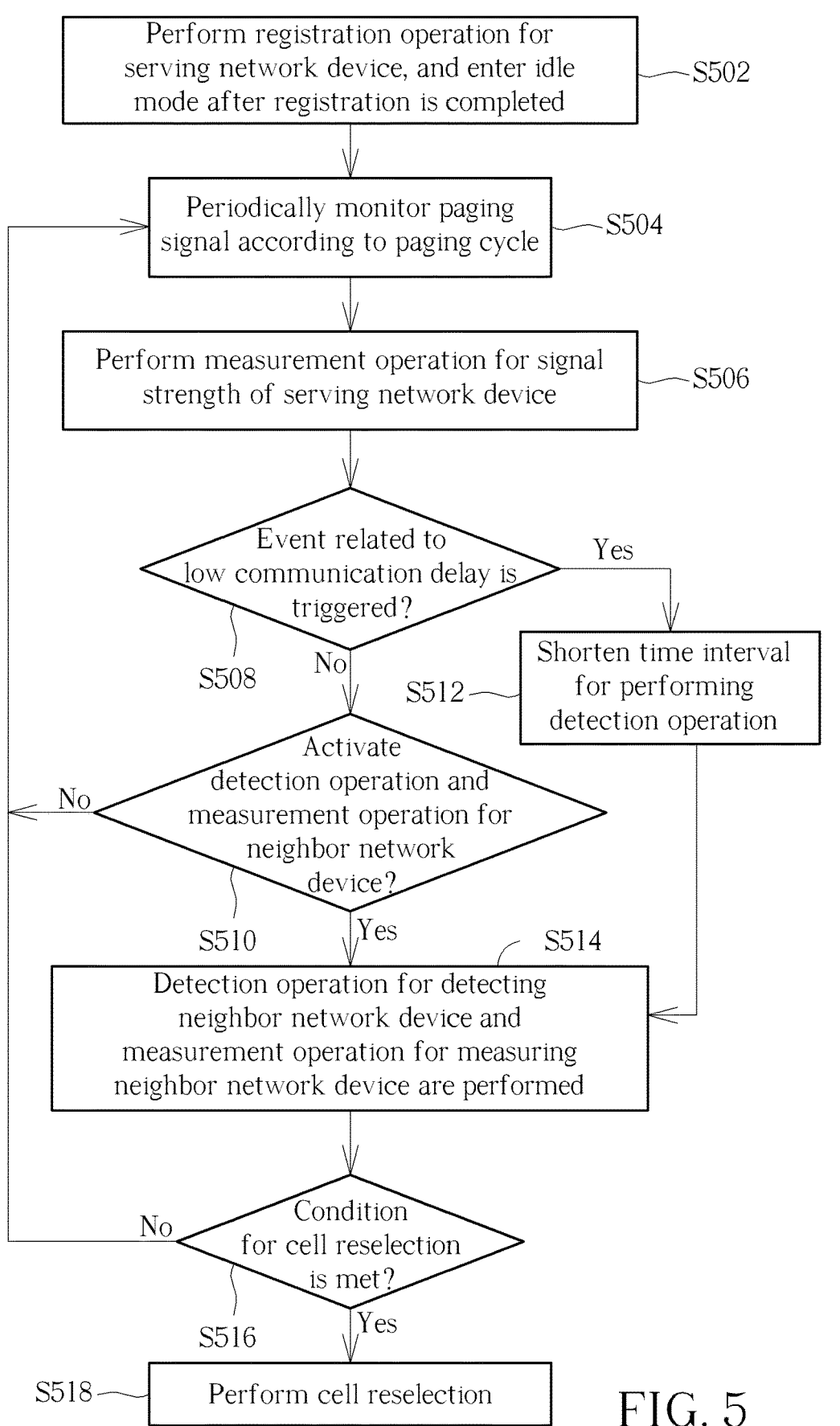
FIG. 5 is a flow chart of a plurality of operations performed by a communication device in an idle mode according to an embodiment of the present invention.

FIG. 5 is a flow chart of a plurality of operations performed by a communication device in an idle mode according to an embodiment of the present invention, wherein the plurality of operations include the operation of the communication device 100 applying the method proposed by the present invention to dynamically adjust the time interval of the detection operation and the subsequent cell reselection operation that may be triggered.

In Step S502, the registration operation for the serving network device is performed. After the registration is completed, the idle mode is entered, and the communication device 100 camps on the cell managed by the serving network device.

In Step S504, the paging signal is monitored periodically according to the paging cycle.

In Step S506, the measurement operation for measuring the signal strength of the serving network device is performed.

In Step S508, it is determined whether the event related to the low communication delay is triggered. As mentioned above, according to at least one of or a combination of at least two of whether the power supply notification signal is received, whether an external supply continuously (and stably) provides power, and whether the signal strength of the serving network device is lower than the threshold value, the communication device 100 determines whether the event related to the low communication delay is triggered. If Yes, Step S512 is entered; if No, Step S510 is entered.

In Step S510, the communication device 100 determines whether to activate the detection operation and the measurement operation for the neighbor network device according to the measurement rule configured by the serving network device. If Yes, Step S514 is entered; if No, Step S504 is entered.

In Step S512, the time interval for performing the detection operation is shortened. For example, the detection period Tdetect is shortened to generate the shortened detection period Tdetect'.

In Step S514, the detection operation for detecting the neighbor network device and the measurement operation for measuring the neighbor network device are performed. If the detection operation and the measurement operation for the neighbor network device are needed to be activated in Step S510, the communication device 100 performs the detection operation and the measurement operation for the neighbor network device according to the detection period Tdetect and the measurement period Tmeasure configured by the network (e.g., the operations shown in FIG. 2). If Step S514 is entered after Step S512 is performed, the communication device 100 performs the detection operation for the neighbor network device according to the shortened detection period Tdetect', and performs the measurement operation for the neighbor network device according to the measurement period Tmeasure (e.g., the operations shown in FIG. 4).

In Step S516, it is determined whether a condition for the cell reselection is met according to a measurement result of the neighbor network device and a measurement result of the serving network device, wherein the condition for the cell reselection is carried in the SI by the serving network device. If Yes, Step S518 is entered; if No, Step S504 is entered.

In Step S518, the cell reselection is performed. Since detailed operations of the cell reselection are defined in relevant communication protocols developed by 3GPP, further descriptions are omitted here.

When it is determined that the event related to the low communication delay is triggered (e.g., an external power continuously (and stably) provides power to the communication device 100), the neighbor network device can be detected directly and the signal strength of the neighbor network device can be measured directly, without considering the signal strength of the serving network device and/or the measurement rule configured by the serving network device. As a result, after the event related to the low communication delay is triggered, the communication device 100 can actively obtain the latest synchronization information of the neighbor network device for being synchronized with the neighbor network device, and can actively perform the measurement operation upon the neighbor network device. In this way, the communication device 100 can promptly detect signal changes between the serving network device and the neighbor network device, and trigger the cell reselection in a timely manner, thereby optimizing the connection quality. In addition, when it is determined that the cell reselection must be performed, there is no need to spend extra time to obtain the synchronization information and/or achieve the time synchronization and the frequency synchronization with the neighbor network device, thereby effectively reducing the communication delay caused by the synchronization operation. The above operations can help reduce the communication delay of the communication device 100 in the idle mode.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device, comprising:
a wireless transceiver circuit, arranged to transmit or receive a plurality of wireless signals; and
a processor, arranged to process the plurality of wireless signals to obtain information regarding a first period configured by a serving network device in order to measure signal strength of the serving network device in an idle mode and obtain information regarding a second period configured by the serving network device in order to detect a neighbor network device in the idle mode, and perform a measurement operation upon the serving network device according to the first period;
wherein the processor is further arranged to determine whether an event related to a low communication delay is triggered; in response to the event not being triggered, the processor performs a detection operation to detect the neighbor network device according to the second period; and in response to the event being triggered, the processor performs the detection operation to detect the neighbor network device according to a third period, and the third period is shorter than the second period.

2. The communication device of claim 1, wherein in the detection operation, the processor achieves time synchronization and frequency synchronization with the neighbor network device according to a plurality of synchronization signals transmitted by the neighbor network device.

3. The communication device of claim 1, wherein the processor determines the event is triggered in response to reception of a power supply notification signal, and the power supply notification signal indicates an external power is supplied to the communication device.

4. The communication device of claim 1, wherein the processor determines whether the event is triggered according to a measurement result of the signal strength of the serving network device; and in response to the measurement result indicating the signal strength of the serving network device is lower than a threshold value, the processor determines the event is triggered.

5. The communication device of claim 4, wherein the processor is further arranged to dynamically adjust a length of the third period according to the measurement result.

6. The communication device of claim 1, wherein the information regarding the first period and the information regarding the second period are carried in system information transmitted by the serving network device.

7. A method for dynamically adjusting a time interval of a detection operation for detecting a neighbor network device performed by a communication device, comprising:
obtaining information regarding a first period configured by a serving network device in order to measure signal strength of the serving network device in an idle mode and obtaining information regarding a second period configured by the serving network device in order to detect the neighbor network device in the idle mode;
performing a measurement operation according to the first period; and
performing the detection operation;
wherein before the detection operation is performed, the method further comprises:
determining whether an event related to a low communication delay is triggered;
wherein in response to the event not being triggered, the detection operation is performed according to the second period; and in response to the event being triggered, the detection operation is performed according to a third period, and the third period is shorter than the second period.

8. The method of claim 7, wherein performing the detection operation further comprises:
receiving a plurality of first synchronization signals transmitted by the neighbor network device and achieving frequency synchronization with the neighbor network device according to the plurality of first synchronization signals; and
receiving a plurality of second synchronization signals transmitted by the neighbor network device and achieving time synchronization with the neighbor network device according to the plurality of second synchronization signals.

9. The method of claim 7, wherein determining whether the event related to the low communication delay is triggered further comprises:
determining whether a power supply notification signal is received, wherein the power supply notification signal indicates an external power is supplied to the communication device; and
in response to reception of the power supply notification signal, determining the event is triggered.

10. The method of claim 7, wherein determining whether the event related to the low communication delay is triggered further comprises:
determining whether the event is triggered according to a measurement result of the signal strength of the serving network device; and
in response to the measurement result indicating the signal strength of the serving network device is lower than a threshold value, determining the event is triggered.

11. The method of claim 10, further comprising:
dynamically adjusting a length of the third period according to the measurement result.

12. The method of claim 7, wherein the information regarding the first period and the information regarding the second period are carried in system information transmitted by the serving network device.

* * * * *